United States Patent [19]

Geilen et al.

[11] Patent Number: 5,035,469
[45] Date of Patent: Jul. 30, 1991

[54] PRESSURE CONTROL DEVICE FOR ANTI-LOCK OR ANTI-SKID SYSTEMS IN MOTOR VEHICLES

[75] Inventors: Herman J. Geilen, Mendig; Klaus Glasmacher, Boppard, both of Fed. Rep. of Germany

[73] Assignee: Lucas Industries public limited company, Birmingham, England

[21] Appl. No.: 457,448

[22] Filed: Dec. 27, 1989

[30] Foreign Application Priority Data

Jan. 23, 1989 [DE] Fed. Rep. of Germany ... 8900706[U]

[51] Int. Cl.⁵ .......................... B60T 8/32; B60T 13/16
[52] U.S. Cl. ...................................... 303/87; 303/116; 303/119
[58] Field of Search ................. 303/87, 113, 114, 115, 303/116, 119

[56] References Cited

U.S. PATENT DOCUMENTS 4,807,945 2/1989 Budecker et al. ................ 303/87 X
4,812,777 3/1989 Shirai ............................... 303/87 X Primary Examiner—Matthew C. Graham
Attorney, Agent, or Firm—Scrivener and Clarke

[57] ABSTRACT

A first control valve which is normally open connects a master cylinder connection to a wheel cylinder connection. A second control valve which is normally closed connects the wheel cylinder connection to a storing chamber for returning brake fluid and to an inlet passage of a return pump when it is in open position. The return pump communicates through an output passage with a damping chamber. The damping chamber is arranged in a valve receptacle for the first control valve, and the storing compartment is arranged in a valve receptacle for the second control valve.

3 Claims, 4 Drawing Sheets

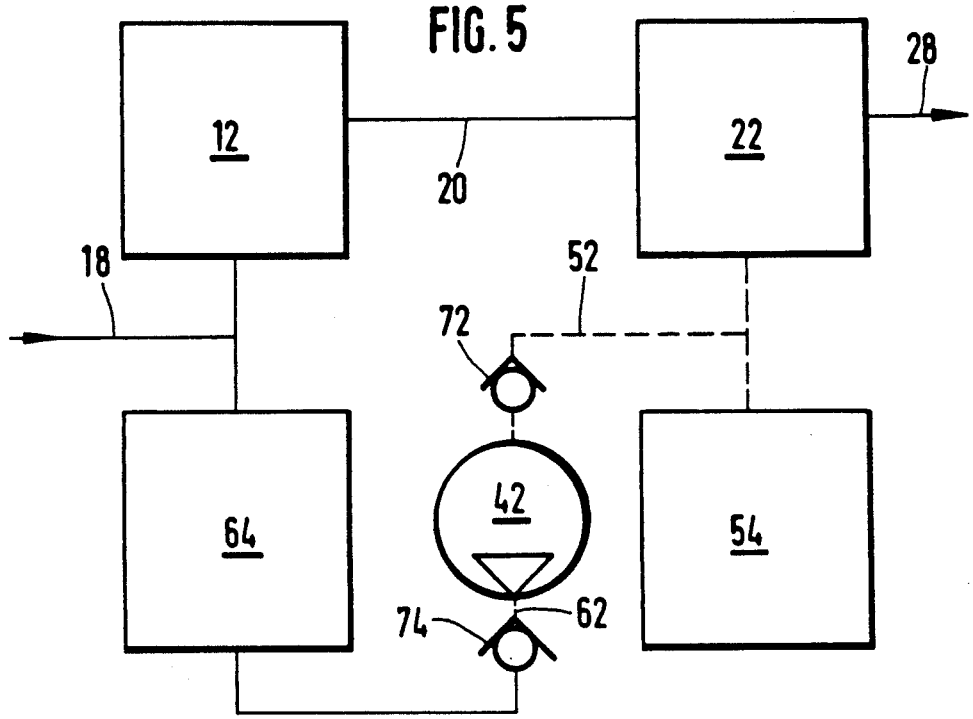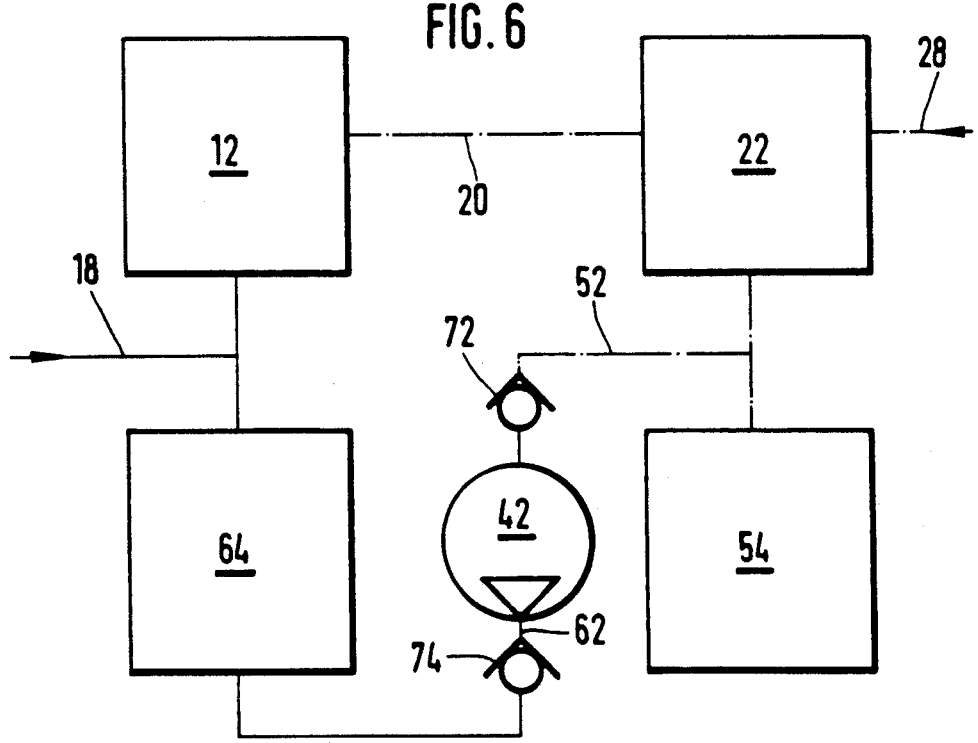

PRESSURE CONTROL DEVICE FOR ANTI-LOCK OR ANTI-SKID SYSTEMS IN MOTOR VEHICLES

The invention relates to a pressure control device for anti-lock or anti-skid systems in motor vehicles, comprising valve receiving means for a control valve each and arranged in a common valve housing, at least one pump receiving means for a return pump, as well as storing and damping chambers.

In a known pressure control device of this kind devised for a dual circuit brake system the valve housing includes a pair of valve receiving means for each brake circuit and taking up a control valve each and, laterally spaced from the same, it comprises a storing chamber or reservoir and a damping chamber. The storing chambers are associated each with a wheel brake cylinder to be connected to the pressure control device and they function to receive brake fluid from the corresponding wheel brake cylinder for relief thereof when there is a risk of potential locking. A return pump communicates with each storing chamber or compartment. It serves the purpose of returning any brake fluid which was preliminarily received by the associated storing chamber through the corresponding damping compartment into a chamber of a master cylinder attached to the pressure control device. The return pumps are reciprocating pumps driven by a common cam and each comprising a suction valve and a pressure valve. These two valves of each of the return pumps are housed in a common pump casing. The brake fluid is conveyed in pulsating fashion by the return pumps into the damping chambers in which the pulsations are to be damped to such a degree that they will not cause interfering oscillations originating from the master cylinder and to be felt, for instance, at a brake pedal.

It is an object of the invention to devise a pressure control device of the kind defined initially in a particularly space-saving manner.

This object is met, in accordance with the invention, in that at least one of the chambers mentioned, the storing and/or damping chamber, is formed as an extension of the corresponding valve receiving means.

In this manner each of the valve receiving means for a control valve can be made in a single working operation together with the associated storing or damping chamber in an especially compact valve housing. Hereby, as well as by the resulting simplification of connecting passages, the time period needed for machining is reduced.

The invention is applicable with particularly great advantage to a device of the kind recited initially, comprising a first control valve which is normally open and connects a master cylinder connection to a wheel brake cylinder connection, a second control valve which is normally closed and, when in open position, connects the wheel cylinder connection to a storing chamber for returning brake fluid and to an inlet passage of the return pump, as well as an outlet passage which connects the return pump to a damping chamber.

In accordance with the invention, such a device preferably is developed further such that the damping chamber is arranged in the valve receiving means for the first control valve and the storing chamber is arranged in the valve receiving means for the second control valve.

If the return pump is embodied by a reciprocating pump including a suction valve and a pressure valve, as is the case with the known pressure control device of the generic kind in question, it is convenient, according to another advantageous feature of the invention, to arrange also the pressure valve in the valve receiving means for the first control valve. That affords further reduction in size of the common valve housing under otherwise unchanged conditions.

The feature mentioned last preferably is developed further according to the invention in that the pressure valve includes a valve body which is retained by the first control valve in the valve receiving means thereof and separates the damping chamber from a valve chamber containing a valve closing member of the pressure valve.

The invention will be described further, by way of example, with reference to the accompanying drawings, in which.

Figure 1:
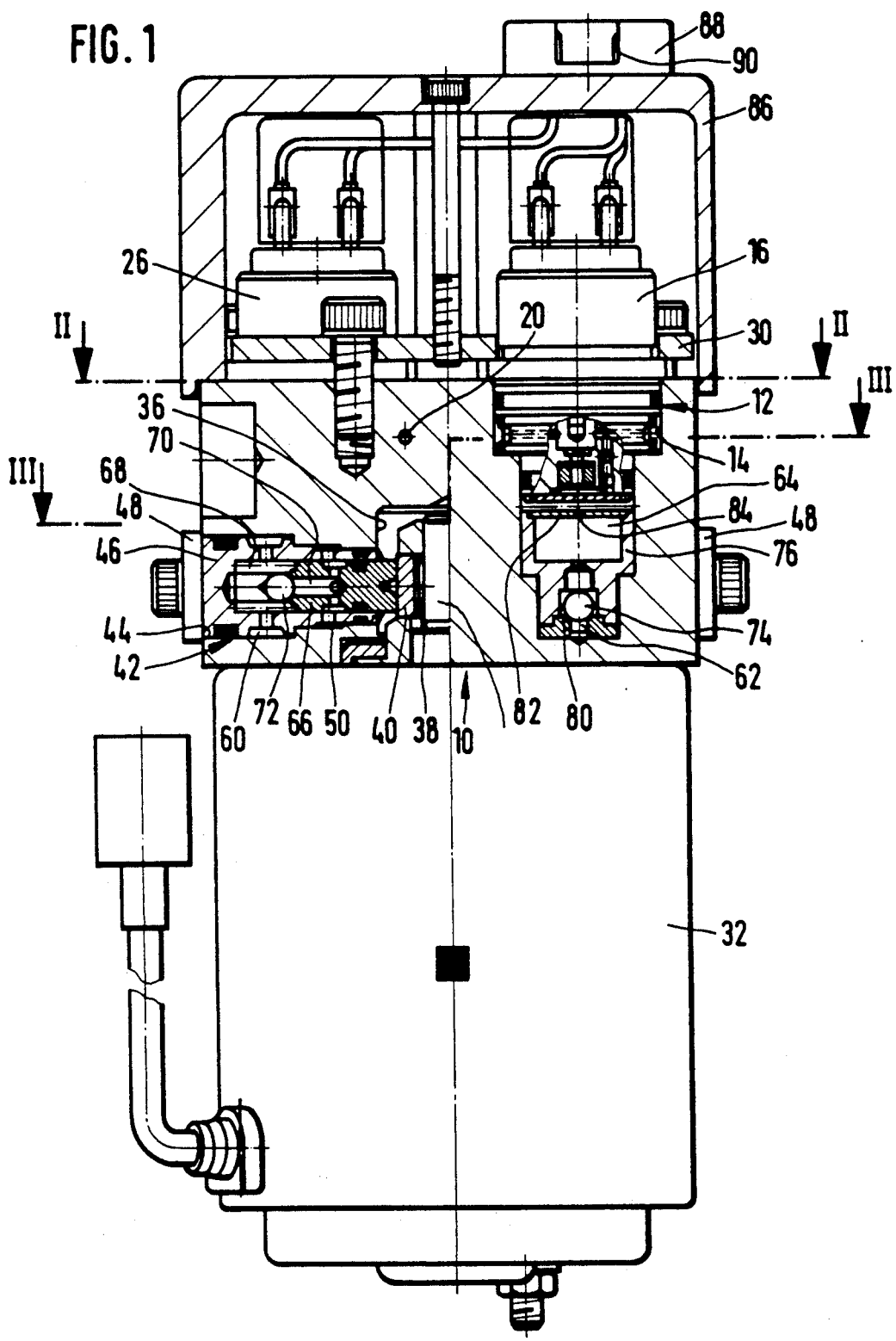
FIG. 1 is a side elevation, partly in section along line I—I of FIG. 2, showing a pressure control device according to the invention.

FIG. 5 presents a circuit diagram including flow connections for normal braking, and FIG. 6 presents the same circuit diagram with flow connections upon braking with the risk of locking.

The pressure control device illustrated is devised for a dual circuit brake system of a motor vehicle. It comprises a valve housing 10 made of a single block of metal. For each of the two brake circuits, the valve housing 10 includes a first control valve 12 which is normally open. It is installed in a first valve chamber 14 and operable by an electromagnet 16. Each of the two normally open control valves 12 is disposed between a master cylinder connection 18 and a communicating passage 20 of the associated brake circuit.

Each of the two brake circuits further comprises a second control valve 22 which is normally closed. It is installed in a second valve receiving means or chamber 24 of the valve housing 10 and operable by an electromagnet 26. The valve receiving means 24 of each of the two normally closed control valves 22 establishes constantly open communication between the communicating passage 20 and a wheel cylinder connection 28 of the associated brake circuit.

Figure 2:
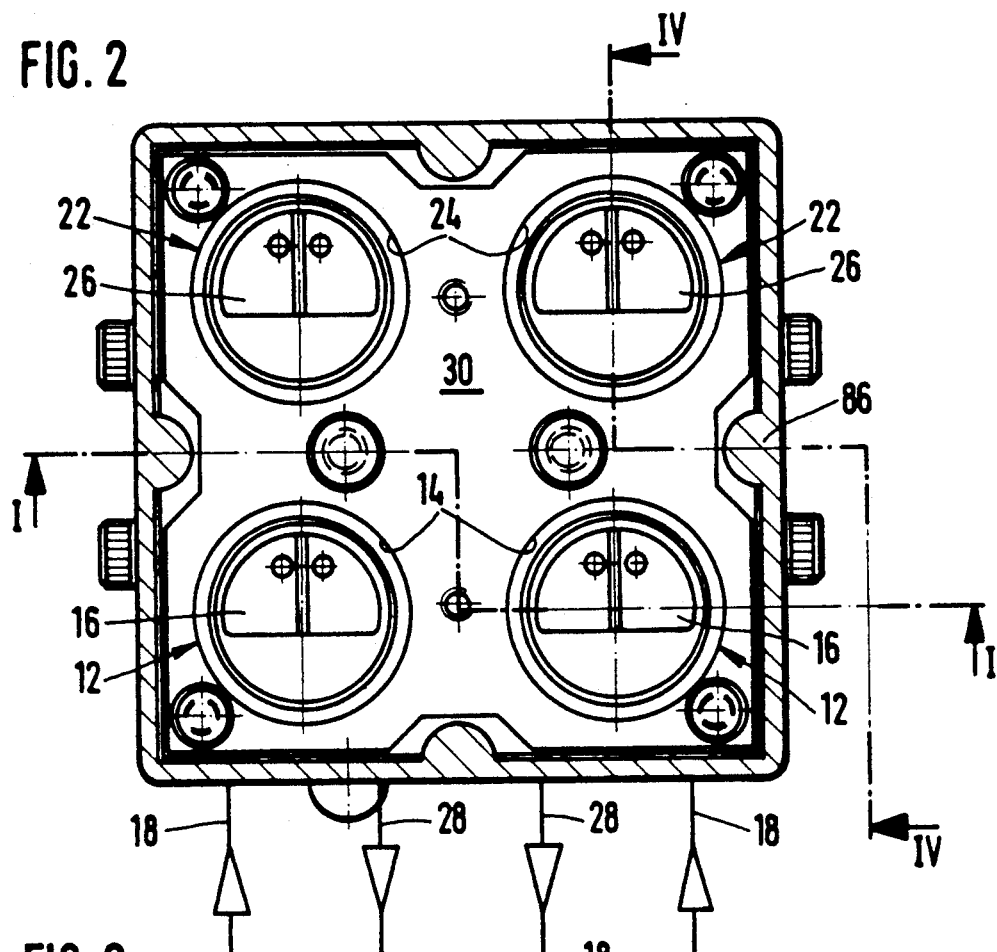
FIG. 2 is a sectional elevation along line II—II of FIG. 1.
Figure 3:
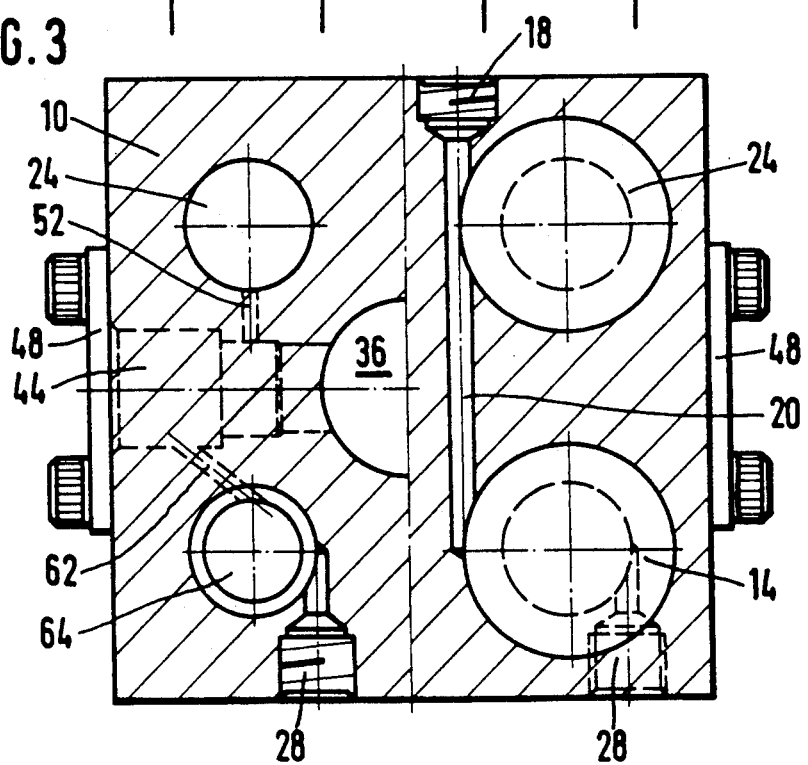
FIG. 3 is a sectional elevation along line III—III of FIG. 1.
Figure 4:
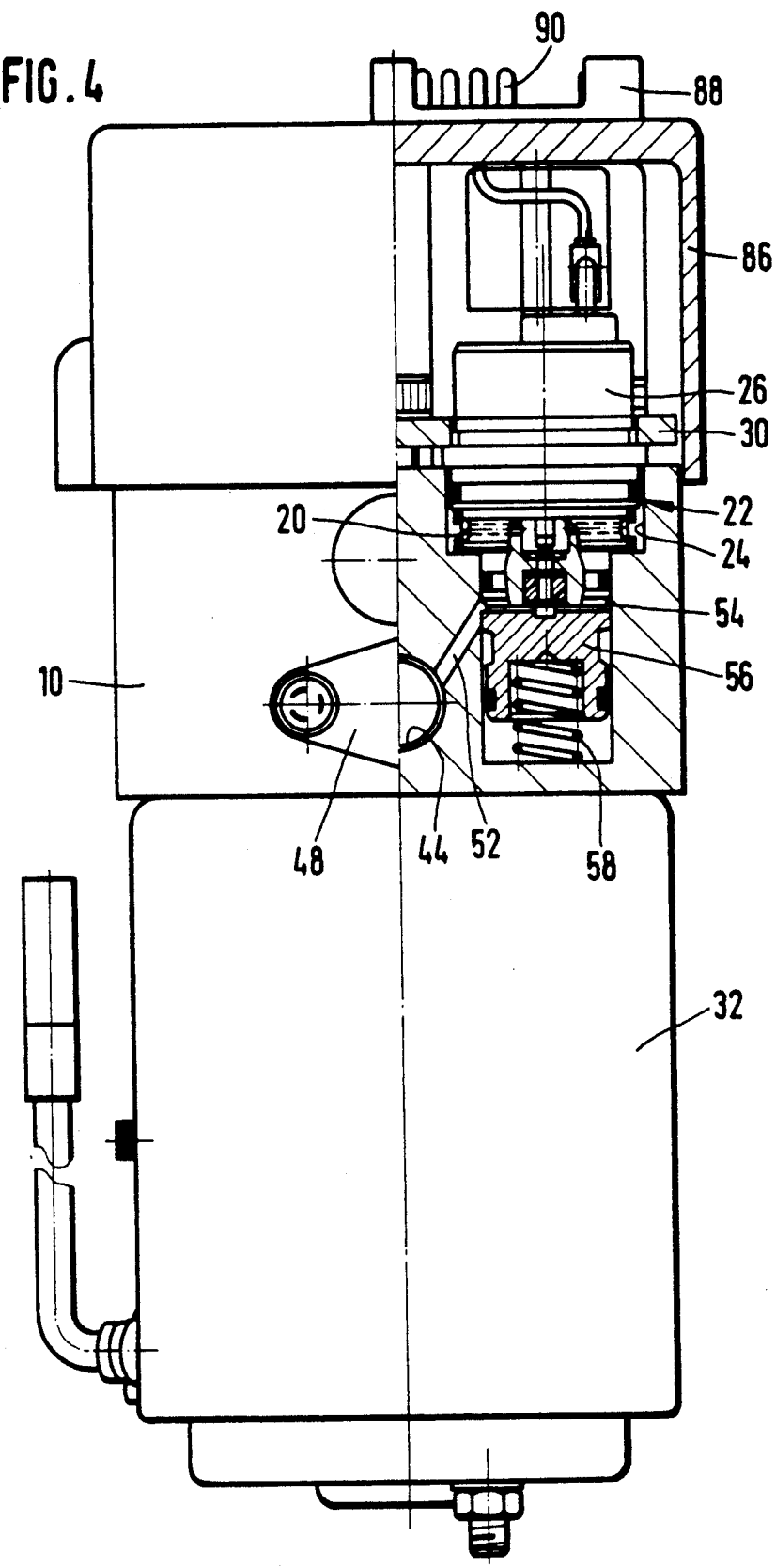
FIG. 4 is the view along line IV—IV of FIG. 2, partly shown in section.

All the electromagnets 16 and 26 are clamped to the valve housing 10 by a common mounting plate 30 and thus also hold the associated control valves 12 and 22, respectively, firmly and sealingly in their respective valve receiving means 14 and 24. An electric motor 32 is fastened to the side remote from the mounting plate 30, being the lower side in FIGS. 1 to 4 of the valve housing 10. The shaft of the electric motor has an eccentric pin 34 formed thereon which pin protrudes into a central recess 36 provided in the valve housing 10 and carries a roller bearing 38 with an outer ring 40.

Two return pumps 42 are arranged in the valve housing 10 transversely of the axis of the electric motor 32 and diametrically opposite each other with respect to the central recess 36, each being received in a radial pump receiving means 44. Each of the two return pumps 42 has a pump casing 46 substantially of rotationally symmetric configuration and held in the corresponding pump receiving means 44 by a mounting plate 48.

The two return pumps 42 are each associated with either one of the two brake circuits and each have an inlet passage 50 which is connected permanently through a communicating passage 52 to a storing chamber 54 of the corresponding brake circuit. The two storing chambers 54 each house an expansion piston 56 which, being loaded by a spring 58, always tends to keep the volume of the associated storing chamber as small as possible. Each of the two storing chambers is formed either as part of or as a direct continuation of the valve receiving means 24 of the corresponding, normally closed, control valve 22 by which it is also normally separated from the corresponding wheel cylinder connection 28. The control valve 22 limits the stroke of the expansion piston 56 in upward direction and makes it unnecessary to provide any other fastening for this piston.

Each of the two return pumps 42 further comprises an outlet passage 60 which is connected through a communicating passage 62 to a damping chamber 64 of the associated brake circuit. Each of the two damping chambers 64 is formed within or as a direct continuation of the valve receptacle 14 of the corresponding control valve 12 which is normally open. The two return pumps 42 each comprise a piston 66 which is guided in the corresponding pump casing 46 and biased radially inwardly by a spring 68 so that it rests on the outer ring 40 and is moved back and forth upon rotation of the eccentric pin 34.

The pump piston 66 of each return pump 42 is formed with an axial passage 70 which is controlled by a suction valve 72 disposed in the corresponding pump casing 46. Each of the two return pumps 42 further comprises a pressure valve 74 which is not arranged within the corresponding pump casing 46, in contrast to the suction valve 72. Instead, it is received in a separate valve body 76 inserted into the corresponding damping chamber 64 from the valve receiving means 14 of the normally open control valve 12 and dividing said compartment from a third valve chamber 80.

In this manner each of the two pressure valves 74 is arranged coaxially with the associated control valve 12 and valve body 76. Each one of the damping chambers 64 is defined by a plate 82 with respect to the corresponding valve receiving means 14, the plate 82 presenting an upper closure of the corresponding valve body 76 and being provided in its center with a small throttle bore 84. The valve body 76 is held in place merely by the control valve 12 arranged on top of it. The plate 82 is simply pressed into the valve body 76 and can be replaced readily together with the valve body or alone by another plate 82 having a wider or narrower throttle bore 84.

The four control valves 12 and 22 and their associated electromagnets 16 and 26 are covered by a common cap 86 which is placed on the valve housing 10 and fastened by screws. A plug connector 88 including plugs 90 is disposed on the cap 86 for connection of the electromagnets 16 and 26 to an electronic control means.

FIGS. 5 and 6 are diagrammatic presentations of operative parts of the pressure control device described and belonging to one of the two brake circuits. As the other brake circuit is fully identical with the one shown, it is not presented in the drawing. Communicating or connecting passages in which the prevailing pressure is that generated by the corresponding master cylinder (not shown) are shown in full lines. Dash-dot lines designate communicating passages in which a controlled lower pressure prevails to prevent locking, and discontinuous lines mark pressureless communicating passages.

Normal braking takes place in the case of FIG. 5. The first control valve 12 of the respective brake circuit is open, while the second control valve 22 is closed. By a pressure generated in a chamber of the master cylinder, brake fluid is urged from the master cylinder connection 18 through the control valve 12 into the communicating passage 20 and then further on past the second control valve 22 to the corresponding wheel cylinder connection 28. Both the corresponding storing chamber 54 and the communicating passage 52 leading to the respective return pump 42 are pressureless. On the other hand, full pressure prevails in the damping chamber 64, being introduced through the master cylinder connection 18.

If the risk of locking develops at the respective wheel of the vehicle and a corresponding signal is released for switchover of the two control valves 12 and 22, the resulting state is as illustrated in FIG. 6. Brake fluid under full pressure as introduced through the master cylinder connection 18 no longer gets into the communicating passage 20. This means that the pressure in the corresponding wheel brake cylinder cannot rise any longer as the first control valve 12 has closed. As soon as the second control valve 22 has opened, pressure is relieved in the associated wheel brake cylinder by the fact that brake fluid flows from the wheel cylinder connection 28 into the communicating passage 20 and through the second control valve 22 into the storing chamber 54. This pressure displaces the expansion piston 56 whereby the storing chamber 54 preliminarily can take up a sufficient quantity of brake fluid to cause the pressure in the corresponding wheel brake cylinder to drop so far that the risk of locking is overcome. In the meantime, the electric motor 32 has started. Consequently the return pump 42 belonging to the brake circuit illustrated gradually pumps the fluid out of the storing chamber 54 by conveying the brake fluid back through the communicating passage 62 and the respective damping chamber 64 into the master cylinder.

What is claimed is:

1. In a pressure control device for anti-lock brake system for motor vehicles comprising a housing, at least one pump chamber in said housing for a return pump, said chamber having inlet and outlet connections, a master cylinder connection, and a wheel brake cylinder connection in said housing, a first valve chamber in said housing for a first normally open control valve connecting said master cylinder and wheel brake cylinder connections, a second valve chamber in said housing for a second normally closed control valve, a storing chamber and a damping chamber in said housing, said second normally closed control valve being moved to an open position in response to skidding conditions to connect said wheel brake connection to said storing chamber, said storing chamber to the inlet connection of said return pump and the outlet connection of said return pump to said damping chamber, the invention wherein said damping chamber is arranged in an extension of said first valve chamber and said storing chamber is arranged in an extension of said second valve chamber, and wherein the outlet connection of said return pump includes a pressure valve which is also arranged in said first valve chamber.

2. In the control device as claimed in claim 1 wherein said pressure valve includes a valve body in said first valve chamber defining a third valve chamber having a valve closing member therein, said valve body being retained in said first valve chamber by said first control valve while separating said damping chamber from said third valve chamber.

3. In the control device as claimed in claim 2 wherein said damping chamber is arranged in said pressure valve body, and a plate formed with a throttle bore therethrough separates said damping chamber from said first control valve.

* * * * *